March 24, 1925.
H. L. GOODWIN
1,531,000
LOAF SLICING MACHINE
Filed May 15, 1923
2 Sheets-Sheet 1
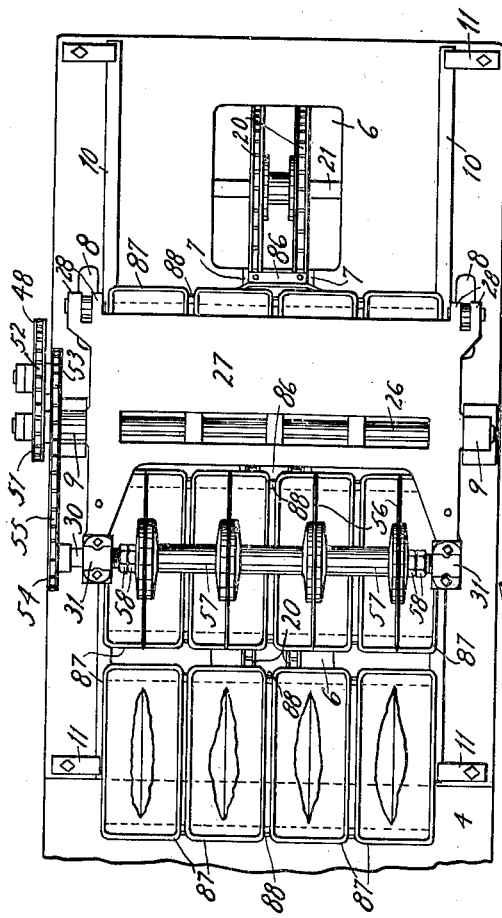
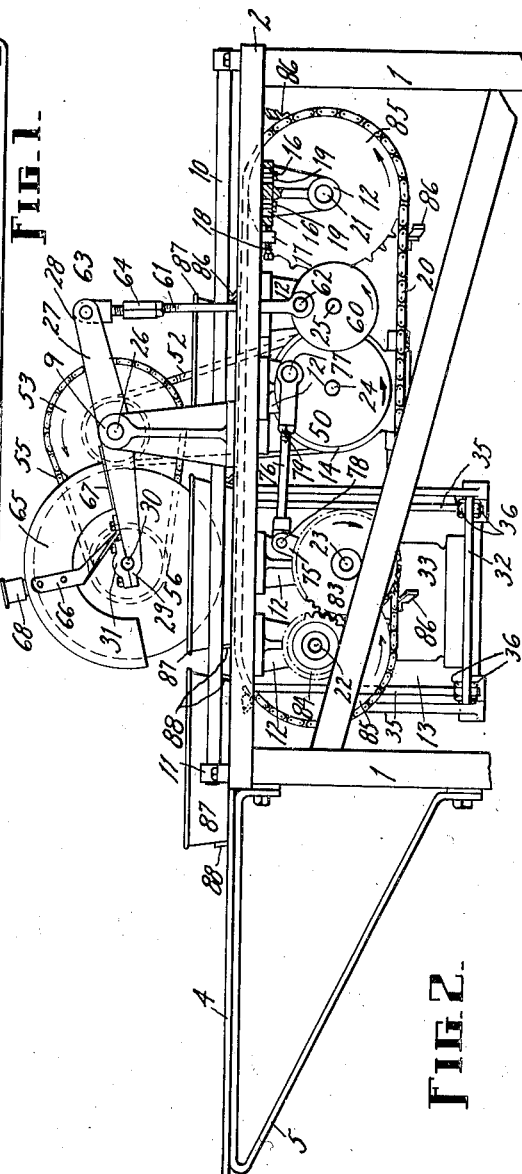
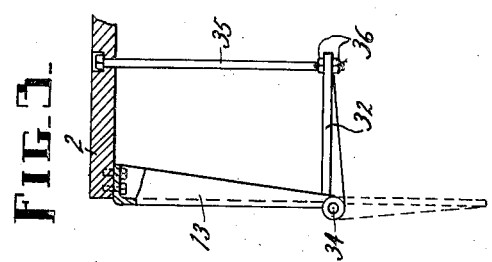
Harry L. Goodwin, INVENTOR.
BY Frank A. Cutter, ATTORNEY.

March 24, 1925.
H. L. GOODWIN
LOAF SLICING MACHINE
Filed May 15, 1923
1,531,000
2 Sheets-Sheet 2
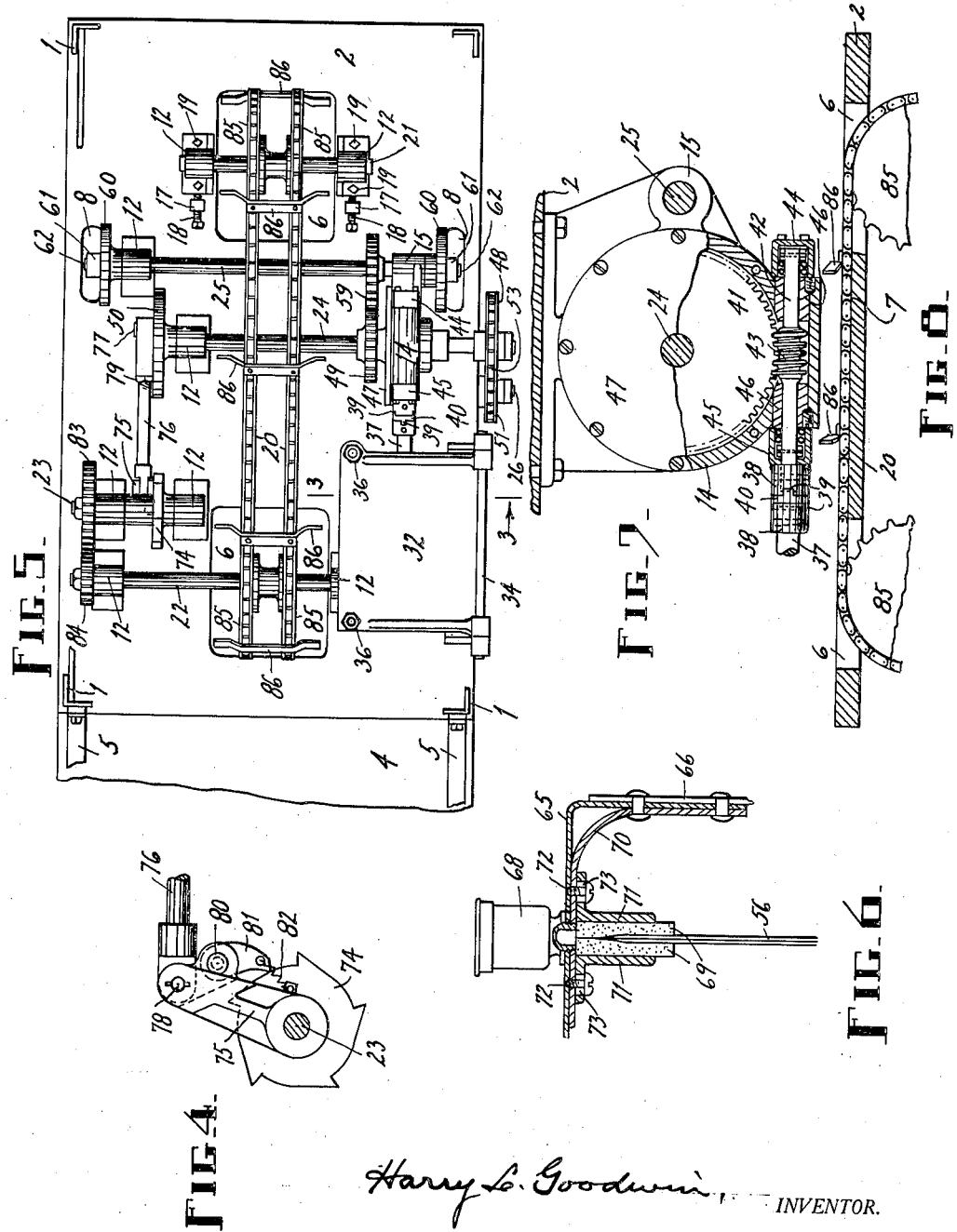

Patented Mar. 24, 1925.

1,531,000

UNITED STATES PATENT OFFICE.

HARRY LELAND GOODWIN, OF SPRINGFIELD, MASSACHUSETTS, ASSIGNOR OF ONE-HALF TO FRANK G. BIRD, OF SPRINGFIELD, MASSACHUSETTS.

LOAF-SLICING MACHINE.

Application filed May 15, 1923. Serial No. 639,134.

*To all whom it may concern:*

Be it known that I, HARRY L. GOODWIN, a citizen of the United States of America, and a resident of Springfield, in the county of Hampden and State of Massachusetts, have invented a new and useful Loaf-Slicing Machine, of which the following is a specification.

My invention relates to improvements in machines for slicing or dividing loaves of bread longitudinally, after the proofing and before the baking steps, involved in the production of bread from flour and other ingredients commonly used, occur, and resides in a suitable frame, an intermittently operating conveyer for actuating pans of bread dough on the table of said frame, revolving and oscillating circular knives with which to make incisions in the dough while the pans containing the same are momentarily at rest or stationary beneath said knives, wipers for said knives, and such other parts and members as may be necessary or desirable in order to render the machine complete in every respect, all as hereinafter set forth.

The primary object of my invention is to produce a machine, which is comparatively simple in construction and operation, for making incisions in the tops of dough masses or loaves that subsequently are to be baked, without tearing or breaking down the cell walls or interior texture of such loaves adjacent to the skin that forms the outsides thereof.

In this machine I employ thin cutting disks or circular knives which have sharp edges, revolve such knives rapidly, and lower the same into cutting position and raise them out of such position while the dough loaves are stationary, with the result that the incisions are made in such loaves delicately and without undue pressure, such incisions extending approximately from end to end and down nearly to the bottoms of the loaves.

Another object is to insure the proper cuts in the dough loaves, and at the same time eliminate danger of having the knives contact with the pans in which such loaves are contained.

A further object is to lubricate the knives to prevent the dough from adhering to the same.

Other objects and advantages will appear in the course of the following description.

I attain the objects and secure the advantages of my invention by the mechanism illustrated in the accompanying drawings, in which—

Figure 1 is a top plan of a loaf-slicing machine which embodies a practical form of my invention, the hood over the knives with the knife wipers carried by said hood being omitted or removed; Fig. 2, a side elevation of said machine; Fig. 3, a detail of the motor support taken on lines 3—3, looking in the direction of the associated arrow, in Fig. 5; Fig. 4, an enlarged, side elevation of the ratchet mechanism by means of which intermittent motion is imparted to the actuating mechanism for the dough pans; Fig. 5, a bottom plan of the machine; Fig. 6, an enlarged, sectional detail of said hood and one of said wipers; Fig. 7, an enlarged, sectional detail of the worm drive, and, Fig. 8, a longitudinal, vertical section through the table of the machine, showing the path of one of the sprocket-chains where such chain passes above, over, and below said table.

Similar reference characters designate similar parts throughout the several views.

The right-hand end of the machine, as the same is disposed in the general views, is the front end, and the left-hand or opposite end is the rear end.

A portion of the shelf or extension at the rear end of the table of the machine is broken off in Figs. 1 and 5, and the bottom portions of the legs of the frame are broken off in Fig. 2.

The frame of my machine comprises, in the present example, four legs 1, a table 2, and an extension 4 at the rear end of said table, such extension being supported by a pair of brackets 5 bolted to the legs at the rear end of the frame. There are two openings 6 in the table 2, such openings being located in the longitudinal center and respectively adjacent to the ends thereof, and two parallel grooves or slots 7 connect adjacent ends of said openings on opposite sides of said longitudinal center. There are also two longitudinal slots 8 in the table 2 adjacent to the longitudinal edges of said table, the forward ends of said slots being somewhat in advance of the vertical plane of the rear edge of the forward opening 6. Bearing brackets 9—9 are erected on the table 2 approximately midway between the ends and immediately adjacent to the sides of said table. Arranged slightly above the table 2 adjacent to the longitudinal edges thereof, by means of brackets 11 which are bolted to said table, are guide rails 10—10, said brackets being located adjacent to the corners of the table. Depending from the underside of the table 2 are eight hangers or bearings 12. Two of the bearings 12 are more nearly adjacent to the front end of the table and on opposite sides of the forward opening 6. A hanger or bracket 13 depends from the underside of the table at what may be termed the right-hand edge and a short distance from the rear end of said table, and the two rearmost bearings 12 are at the left of said bracket. Another of the bearings 12 is forward of and in line with the outermost rear bearing, and still another bearing 12 is at the right of said first-named bearing and between it and the rear opening 6. A gear-case 14 depends from the underside of the table, forward of the transverse, vertical plane of the table in which is located the forward edge of the bracket 13, and another of the bearings 12 is at the left of said gear-case. On the front edge of the gear-case 14 is a bearing 15, and one of the bearings 12 is at the left of said first-named bearing.

The hangers or bearings 12 are bolted to the table 2, and each of the two foremost of said bearings is slotted to receive the bolts by means of which the same is attached to said table, as represented at 16—16 in Fig. 2 wherein the foremost bearing therein appearing is broken away to show such slots. These slots enable the foremost bearings to be adjusted forwardly and rearwardly. Behind the foremost bearings 12 are two lugs 17 into and through which are tapped two horizontal bolts 18. The bolts 18 at their forward ends engage the bearings 12 in front, and thus assist the bolts (19), which pass upwardly through said bearings into threaded engagement with the table, when tightened, in holding said bearings securely in place. Upon loosening the bolts 19 and rotating the bolts 18 in one direction or the other, the foremost bearings are moved forwardly or permitted to be moved rearwardly, according to the direction in which said second-named bolts are rotated, and then the vertical bolts are retightened. Thus a take-up is provided for two sprocket-chains 20 which will presently be described.

Journaled in the foremost and rearmost pairs of bearings 12 are shafts 21 and 22, the former being in front and the latter behind. Journaled in the bearings 12 directly in front of the shaft 22 is a shaft 23.

A shaft 24 is journaled in the gear-case 14 and its associated bearing 12, and a shaft 25 is journaled in the bearing 15 and its associated bearing 12. All of these shafts extend transversely of the machine and are parallel with each other. A shaft 26 is journaled in the brackets 9, and a carrier or rocker 27 is mounted on said shaft between said brackets. The rocker 27 in plan is substantially of the shape illustrated in Fig. 1, is provided at each front corner with bearing lugs 28, and has rearwardly-extending arms behind said lugs, which arms afford bearings 29—29 for a shaft 30 that is parallel with the shaft 26. The bearings 29 are completed by means of caps 31—31.

A shelf 32, for an electric motor 33, has its outer edge pivotally connected at 34 with the bottom of the bracket 13, and may be retained in a horizontal position by means of two bolts 35 each of which is provided with two nuts 36. Each bolt 35 extends downwardly through the table 2, with the head of such bolt let into the top of said table, and is adapted to pass through the shelf 32 adjacent to one of the inner corners thereof, one of the nuts 36 on said bolt being above said shelf and the other of said nuts on said bolt being below said shelf when the latter is in normal supporting position for the motor 33. Upon removing the lower nuts 36 and disengaging the bolts 35 and shelf 32, the latter can be swung downwardly on the pivot 34 into the position indicated by dotted lines in Fig. 3. With equal facility the shelf 32 can be restored to and secured in supporting position again. The shelf, when swung upwardly into horizontal position, receives the lower terminals of the bolts 35 below the upper nuts 36, and then the lower nuts 36 are screwed onto such terminals underneath such shelf. Thus provision is made, not only for affording a suitable support for the motor, but also for enabling said motor to be taken away and returned to place in a comparatively small space.

Extending forwardly from the motor 33 is a shaft 37, and secured to said shaft at the forward end is a collar 38 having in the face thereof a diametral groove to receive a diametral rib 39 on the back side of a coupling 40. The coupling 40 has on the front side a second diametral rib 39 which is at right-angles to the first. Secured to the shaft 24 and located in the gear-case 14 is a worm-wheel 41, and journaled in said gear-case below said worm-wheel is a shaft 42 which carries a worm 43 that intermeshes with the worm-wheel. The axis of the shaft 42 is in line with the axis of the motor shaft 37, and secured to said first-named shaft at the rear end is a collar 38 similar to the first-named collar 38, and having in the face thereof a diametral groove to receive the rib 39 on the front side of the coupling 40. The ribs 39, being in angular relationship to each other, when the parts are assembled, hold the coupling 40 in place between the two collars 38. The shaft 42 is driven from the shaft 37 through the medium of the collars 38 and the coupling 40. The collars 38 may be held in place on their respective shafts by means of transverse taper pins, substantially as shown. When it is desired to uncouple the motor shaft from the worm shaft, in order to enable the shelf 32 to be swung downwardly and the motor 33 to be removed, it is simply necessary to release the rear collar 38 from said motor shaft, slip said collar rearwardly out of engagement with the coupling 40, and slip the latter out of engagement with the other collar 38. Obviously these shafts can be rotatably connected again without difficulty by properly connecting the coupling 40 with the front collar 38, slipping the rear collar 38 forwardly into engagement with said coupling, and securing said last-named collar to the shaft 37. A cap 44 over the forward terminal of the shaft 42 is bolted to the front end of the base of the gear-case 14, and a generally similar cap 45 encircles said shaft between the rear end of said base and the front collar 38, to which rear end said last-named cap is bolted. Within the caps 44 and 45 are ball-bearings for the shaft 42, the same being of ordinary construction and substantially as shown in Fig. 7. There are also bushings 46—46 in the aforesaid gear-case base for the shaft 42. At 47 is represented a cover for the left-hand side of the gear-case 14. Secured to the shaft 24 at the outer terminal is a sprocket-wheel 38, and secured to said shaft at the left of the gear-case is a gear 49. A crank disk 50 is secured to the shaft 24 at the inner or left-hand terminal thereof. A sprocket-wheel 51 is secured to the shaft 26 at the right-hand terminal thereof and in the same plane with the sprocket-wheel 48, and a sprocket-chain 52 connects the two sprocket-wheels. A sprocket-wheel 53 is secured to the shaft 26 inside of the sprocket-wheel 51, and a sprocket-wheel 54 is secured to the shaft 30 at the right-hand terminal thereof and in line with said first-named sprocket-wheel. A sprocket-chain 55 connects the sprocket-wheels 53 and 54. There are four (more or less) disk knives 56 mounted on and secured to the shaft 30. The shaft 24 is driven constantly from the motor 33 through the medium of the connected shafts 37 and 42, the worm 43, and the worm-wheel 41, and said first-named shaft drives the knives 56 through the medium of the sprocket-wheel 48, sprocket-chain 52, sprocket-wheels 51 and 53, sprocket-chain 55, sprocket-wheel 54, and shaft 30. The rotary motion thus imparted to the knives 56 is rapid, due to the fact that the sprocket-wheel 51 is smaller than the sprocket-wheel 48, and the sprocket-wheel 54 smaller than the sprocket-wheel 53.

The knives 56 are spaced equi-distant apart by means of three sleeves 57 which are mounted on the shaft 30 between the hubs of said knives, and the latter and said sleeves are bound together by means of a pair of nuts 58 outside of the hub of each end knife and between the same and the adjacent bearing 29 and cap 31, said shaft 30 having a screw-threaded part at each terminal to receive said nuts. Upon disengaging the sprocket-chain 55 from the sprocket-wheel 54, and removing the caps 31, the shaft 30 can be removed from the bearings 29, and the knives 56 and the sleeves 57 can be removed from said shaft upon taking off the nuts 58 at either end. Removal of the knives may be necessary for various reasons, and it may be desired to use more or less than the number previously used, in which latter event sleeves 47 of different lengths must be provided.

Secured to the shaft 25 in line and intermeshing with the gear 49 is a gear 59, and secured to said shaft adjacent to the terminals thereof are two crank disks 60. A connecting rod 61 has its lower terminal pivoted at 62 to one of the crank disks 60, and its upper terminal pivotally connected at 63 with the bearing lugs 28 which are above such disk. The rods 61 pass through and operate in the slots 8. Each connecting rod 61 may be divided, screw-threaded, and provided with an ordinary turnbuckle 64, to enable said rod to be lengthened or shortened for the purpose of varying the stroke imparted by the rod to the rocker 27. As the shaft 26 is caused to revolve by the intermeshing gears 49 and 59, the crank disks 60 revolve with said shaft, and, through the medium of the connecting rods 61, impart an oscillatory movement which is constant to the rocker 27, and cause the shaft 30 with the knives 56 to be raised and lowered. This is accomplished without interfering with the rotation of the shaft 30, because the rocker 27 and the sprocket-wheel 53 are mounted on the same shaft 26, and the knives 56 and the sprocket-wheel 54 are mounted on the same shaft 30.

A hood 65 is provided for the blades 56, such hood being supported on and carried by the rocker 27, through the medium of a bracket or arm 66 and a flange 67 at each end of said hood. Each arm 66 is rigidly attached to the hood 65 at one end and has its base firmly bolted to the top of the rocker 27 behind one of the caps 31. Each flange 67 projects outwardly from one end of the hood 63 and rests on top of the contiguous portion of the rocker 67. The hood 65 is concentric with the blades 56, and, of course, oscillates with the rocker 27. The hood must, as a rule, be removed from the rocker before taking out the knives.

A wiper is provided for each knife 56, for the purpose of moistening, oiling, or otherwise lubricating the edge or peripheral portion of such knife to prevent the dough from adhering thereto. Referring to Fig. 6, it will be seen that the hood 65 has mounted thereon a fluid cup 68, and is provided with a wiper consisting of a pair of felt or other porous or absorbent pieces 69. There is a cup 68 and a wiper for each knife. A brace 70 extends beneath the top of the hood 65 from one side to the other of the same, to stiffen the hood. Two angle-irons 71 are secured by means of a pair of screws 72 to the brace 70 and the top of the hood, and the wiper pieces 69 are received beneath said brace and between said angle-irons. The laterally-extending parts of the angle-irons 71, through which the screws 72 extend to be tapped into the brace 70 and the top of the hood, are slotted at 73—73 for the purpose of enabling said angle-irons to be adjusted toward and away from each other before said screws are tightened. Thus more or less of a clamping pressure may be exerted on the wiper pieces or felts 69, and the degree of pressure of said felts on the knife 56 which rotates between them increased or decreased or regulated, it being understood that said knife in rotating passes between said felts. The cup 68 has a screw-threaded neck at the bottom which is tapped into the top of the hood 65 and the brace 70, and said cup is located directly above the pair of wiper felts 69, consequently the contents of the cup comes into contact with the upper edges of said felts and is absorbed by the latter. As the knife 56 revolves between the felts 69, the liquid material with which said felts are saturated is transferred to the cutting edge of said knife.

In the event the position of the knives 56 is changed laterally, as when the number of such knives is increased or decreased, the position of each cup 68 and wiper must be changed accordingly, and this can be effected by providing additional tapped openings in the hood 54 and brace 70 for the screw-threaded neck of the cup and for the screws 72.

Secured to the shaft 23 is a ratchet-wheel 74, and loosely mounted on said shaft is an arm 75 which projects upwardly. The ratchet-wheel 74 is in line with the crank disk 50, and connecting said disk and the arm 75 is a rod 76. The rod 76 is pivotally connected at 77 with the disk 50 and at 78 with the arm 75 at the upper terminal. This connecting rod may be made in two parts, one of which is tapped into the other, and equipped with a lock-nut 79, to provide means for lengthening or shortening said rod and correspondingly changing the amount of movement imparted by the rod, as the disk 50 revolves, to the arm 75. Pivotally connected at 80 to the arm 75 is a downwardly-directed pawl 81 the free end of which rides on the ratchet-wheel 74. A spring 82, having one end attached to the pawl 81 and the other end attached to the arm 75, yieldingly retains the beak of the pawl 81 in contact with the teeth of the ratchet-wheel 74. The ratchet-wheel 74 has five teeth, and at each revolution of the disk 50 the connecting rod 76 rocks the arm 75 rearwardly far enough to carry the pawl 81 out of engagement with one of said teeth and into engagement with the next following tooth, and then rocks said arm forwardly far enough to impart to said ratchet-wheel one-fifth of a revolution. Thus the shaft 28 is intermittently rotated, and with it a gear 83 secured to said shaft at the outer terminal. The gear 83 intermeshes with a gear 84 secured to the shaft 22 at the outer terminal, and said shaft is, therefore, intermittently rotated.

Two sprocket-wheels 85 are secured to the shaft 21, and two more sprocket-wheels 85 are secured to the shaft 22. The front sprocket-wheels 85 are below the forward openings 6 in the table 2, and the rear sprocket-wheels 85 are below the back opening 6 in said table. The front and rear sprocket-wheels 85, on each side of the vertical, central plane of the machine, are connected by one of the sprocket-chains 20. Secured to the chains 86 crosswise thereof and equidistant apart are pusher lugs 86 of the shape substantially as shown. The sprocket-wheels 85 and sprocket-chains 20 with their lugs 86 constitute the pan conveyer of the machine. The lugs 86 are carried by the sprocket-chains 20 up through the front opening 6, along the top of the table 2, down through the rear opening 6, and forward to complete the circuit. The sprocket-chains 20 pass through the slots 7 in the top of the table 2 between the openings 6, the depth of which latter is the same as the depth of said sprocket-chains. Thus the reaches of the sprocket-chains 20 which pass over the table 2 have their top edges flush with the upper surface of said table, and carry the laterally-extending wings of the lugs 86 above such surface. Since the rear sprocket-wheels 85 are secured to the shaft 22, said sprocket-wheels and the sprocket-chains 20 are driven intermittently by said shaft.

In Figs. 1 and 2 pans for the dough loaves are represented at 87. These pans are arranged laterally in sets of four, corresponding with the number of knives 56, the pans in each set being fastened together by straps 88 at the ends. Each set of pans fits between the guide rails 10, the distance between any two adjacent lugs 86 is a little greater than the length of any pan, and the timing of the mechanism is such that, during each dwell of the sprocket-chains 20, one lug 86 is in position to locate the pan set behind and actuated by the same directly beneath the knives 56, with the transverse, central, vertical plane of the pans in such set, or the longitudinal, central, vertical plane of said pan set, coinciding approximately, if continued upwardly, with the axis of the cutter shaft 30 when the latter is in its low position. The diameter of each knife 56 and the movement of the rocker 27 are such that, when the latter is rocked to carry said knives downwardly, they cut into the longitudinal centers of the dough loaves in the pans 88 below and down to within a short distance of the bottoms of said pans, and make incisions in said loaves which are only a little less than the extreme lengths of the loaves. In other words, the diameter of the knives 56 and the downward movement of said knives are such that the knives in their low position clear to the extent required the bottoms and ends of the pans.

The operation of the machine as a whole is described as follows, assuming that the current be turned on to the motor 33 and the mechanism driven by said motor be in operation:

One pan set after another is placed on the table 2 at the front end, and each set is engaged by a lug 86 as the same emerges from the front opening 6. Each lug 86 is of sufficient length to contact with portions of the two central pans 87, in any set, at their front ends. The lugs 86 move the pan sets intermittently rearwardly on the table 2, and as each set arrives beneath the knives 56 said knives descend and make the incisions in the dough loaves which the pans in the set contain. The knives are in their elevated position while the pan set is being actuated into position beneath them, and, after said knives have descended and made their incisions in the then stationary dough loaves, they are elevated again before the set moves on. While the knives are in their elevated position the pan set carrying the dough loaves in which the incisions have just been made is actuated rearwardly, and the next succeeding pan set is actuated into position beneath said knives. In this manner the dough loaves in one pan set after another are cut until there are no more to be passed through the machine. The pan sets with the cut dough loaves are actuated by the lugs 87 and pushed by succeeding pan sets out onto the extension 4 from which they are removed.

More or less change in the shape, size, construction, and arrangement of some or all of the parts of this machine may be made without departing from the spirit of my invention or exceeding the scope of what is claimed.

What I claim as my invention, and desire to secure by Letters Patent, is—

1. In a loaf-slicing machine, a table, means intermittently to actuate a pan on said table, a rotating dough-cutting knife having its axis at right-angles to the direction of travel of said pan, and an approximately horizontal oscillating carrier for said knife.

2. In a loaf-slicing machine, a table, means intermittently to actuate a pan on said table, a rotating dough-cutting knife having its axis at right-angles to the direction of travel of said pan, and an approximately horizontal oscillating carrier for said knife, said carrier being provided with a wiper for said knife.

3. The combination, in a loaf-slicing machine, with a table, shafts journaled beneath said table, sprocket-wheels secured to said shafts, sprocket-chains provided with lugs carried by said sprocket-wheel, said table having openings therein for the passage of said lugs, and means intermittently to drive said sprocket-wheels, of an approximately horizontal rocker mounted above and crosswise of said table and said sprocket-chains, means to oscillate said rocker, a shaft carried by said rocker, said last-named shaft always being behind the vertical plane of the axis of said rocker, means to rotate said last-named shaft, and a dough-cutting knife secured to said last-named shaft.

4. The combination, in a loaf-slicing machine, with a table, a shaft journaled beneath said table, sprocket-wheels secured to said shafts, sprocket-chains carried by said sprocket-wheels, lugs extending across said sprocket-chains on the outside, each of said lugs being affixed to both sprocket-chains, and said table having openings therein for the passage of said lugs, and slots therein between said openings for the passage of said sprocket-chains, while said lugs pass above the upper surface of the table, and means intermittently to drive said sprocket-wheels, of an approximately horizontal rocker mounted above and crosswise of said table and said sprocket-chains, means to actuate said rocker, a shaft carried by said rocker, said last-named shaft always being behind the vertical plane of the axis of the rocker, means to revolve said last-named shaft, and a dough-cutting knife secured to said last-named shaft.

5. The combination, in a loaf-slicing machine, with a table, shafts journaled beneath said table, sprocket-wheels secured to said shafts, sprocket-chains provided with lugs carried by said sprocket-wheels, said table having openings therein for the passage of said lugs, a third shaft journaled beneath said table, a ratchet-wheel secured to and an arm loosely mounted on said third shaft, said arm being provided with a pawl to engage said ratchet-wheel, power-driven actuating means for said arm, and driving means between said third shaft and one of the sprocket-wheel shafts, of an approximately horizontal rocker mounted over and crosswise of said table and sprocket chains, means to oscillate said rocker, a shaft carried by said rocker, said rocker shaft always being behind the vertical plane of the axis of said rocker, means to rotate said rocker shaft, and a dough-cutting knife secured to said rocker shaft.

6. The combination, in a loaf-slicing machine, with a table, shafts journaled beneath said table, sprocket-wheels secured to said shafts, sprocket-chains provided with lugs carried by said sprocket-wheels, said table having openings therein for the passage of said lugs, a third shaft journaled beneath said table, driving means between said third shaft and one of the sprocket-wheel shafts, a ratchet-wheel secured to and an arm loosely mounted on said third shaft, said arm being provided with a pawl to engage said ratchet-wheel, a fourth shaft journaled beneath said table, a crank member secured to said fourth shaft, a connecting rod between said crank member and said arm, and driving means for said fourth shaft, of an approximately horizontal rocker mounted above and crosswise of said table and sprocket-chains, means to oscillate said rocker, said rocker shaft always being behind the vertical plane of the axis of said rocker, a shaft carried by said rocker, means to rotate said last-named shaft, and a dough-cutting knife secured to said last-named shaft.

7. The combination, in a loaf-slicing machine, with a table, two shafts journaled beneath said table, means constantly to drive the second from the first of said shafts, a third shaft journaled beneath said table and provided with a ratchet, means to actuate said ratchet from said first shaft, other shafts journaled beneath said table and provided with sprocket-wheels, means to drive one of the sprocket-wheel shafts from the ratchet shaft, and sprocket-chains provided with lugs carried by said sprocket-wheels, said table having openings therein for the passage of said lugs, of an approximately horizontal rocker mounted over and crosswise of said table and sprocket-chains, means to oscillate said rocker from said second shaft, a shaft carried by said rocker, said rocker-shaft always being behind the vertical plane of the axis of said rocker, means to rotate said rocker shaft from said first shaft, and a dough-cutting knife secured to said rocker shaft.

8. The combination, in a loaf-slicing machine, with a table, two shafts journaled beneath said table, means constantly to drive the second from the first of said shafts, a third shaft journaled beneath said table and provided with a ratchet, means to operate said ratchet from said first shaft, other shafts journaled beneath said table and provided with sprocket-wheels, means to drive one of the sprocket-wheel shafts from the ratchet shaft, sprocket-chains provided with lugs carried by said sprocket-wheels, said table having openings therein for the passage of said lugs, and crank members carried by said second shaft, of an approximately horizontal rocker mounted above and crosswise of said table and said sprocket-chains, connecting rods between said crank members and said rocker, a shaft carried by said rocker, said rocker shaft always being behind the vertical plane of the axis of said rocker, means to rotate said rocker shaft, and a dough-cutting knife secured to said rocker shaft.

9. The combination, in a loaf-slicing machine, with a table, two shafts journaled beneath said table, a worm-wheel secured to the first shaft, a worm to drive said worm-wheel, means constantly to drive the second shaft from said first shaft, a third shaft journaled beneath said table and provided with a ratchet, means to actuate said ratchet from said first shaft, other shafts journaled beneath said table and provided with sprocket-wheels, means to drive one of the sprocket-wheel shafts from the ratchet shaft, sprocket-chains provided with lugs carried by said sprocket-wheels, said table having openings therein for the passage of said lugs, a sprocket-wheel secured to said first shaft, and crank members carried by said second shaft, of a shaft journaled above and crosswise of said table, and said sprocket-chains, sprocket-wheels secured to and a rocker loosely mounted on said last-named shaft, a shaft carried by said rocker, said rocker shaft always being behind the vertical plane of said shaft upon which said rocker is mounted, a sprocket-wheel secured to said rocker shaft, a sprocket-chain between said sprocket-wheel on said first shaft and said sprocket-wheel on said shaft upon which said rocker is mounted, a sprocket-chain between said sprocket-wheel on said last-named shaft and said sprocket-wheel on said rocker shaft, connecting rods between said crank members and said rocker, and a dough-cutting knife secured to said rocker shaft.

10. The combination, in a loaf-slicing machine, with a table, two shafts journaled beneath said table, means to drive the second from the first of said shafts, a third shaft journaled beneath said table, means intermittently to rotate said third shaft from said first shaft, other shafts journaled beneath said table and provided with sprocket-wheels, means to drive one of the sprocket-wheel shafts from said third shaft, and sprocket-chains provided with lugs carried by said sprocket-wheels, said table having openings therein for the passage of said lugs, of an approximately horizontal rocker mounted over and crosswise of said table and said sprocket-chains, means to oscillate said rocker from said second shaft, a shaft carried by said rocker, said rocker shaft always being behind the vertical plane of the axis of said rocker, means to rotate said rocker shaft from said first shaft, and a dough-cutting knife secured to said rocker shaft.

11. In a loaf-slicing machine, a table, a hanger depending therefrom, a shelf pivotally connected with said hanger, bolts and nuts adapted to aid said hanger in supporting said shelf in a horizontal position from said table, a motor receivable on said shelf, said motor having a shaft, driving mechanism beneath said table, said mechanism consisting in part of a shaft, and coupling means between said motor shaft and said second-named shaft, which means may be disengaged to permit said shelf to be swung downwardly with said motor thereon, when said nuts and bolts and said shelf are disengaged.

12. The combination, in a loaf-slicing machine, with a table, and means intermittently to actuate pans on said table, of bearing brackets on opposite sides of said table, an approximately horizontal rocker supported crosswise of said table by said brackets, means to oscillate said rocker, a shaft carried by said rocker, said shaft always being behind the vertical plane of the axis of said rocker, means to drive said shaft, a dough-cutting knife secured to said shaft, and a hood mounted on said rocker over said knife, said hood being provided with a wiper for said knife.

13. In a loaf-slicing machine, a table, a rocker mounted over and crosswise of said table, a shaft carried by said rocker, a dough-cutting knife secured to said shaft, and a hood mounted on said rocker, and provided with lubricating means for said knife.

14. In a loaf-slicing machine, a table, a rocker mounted above and crosswise of said table, a shaft carried by said rocker, a dough-cutting knife secured to said shaft, a hood mounted on said rocker, absorbent material carried by said hood in engagement with said knife, and a fluid cup mounted on said hood and opening through the same to said absorbent material.

15. In a loaf-slicing machine, a rotary dough-cutting knife, a shaft for said knife, an oscillating carrier for said shaft, a hood mounted on said carrier, angle-irons secured within said hood, and pieces of absorbent material held by said angle-irons in engagement with said knife.

16. In a loaf-slicing machine, a rotary dough-cutting knife, a shaft for said knife, an oscillating carrier for said shaft, a hood mounted on said carrier, angle irons secured within said hood, pieces of absorbent material held by said angle-irons in engagement with said knife, and a fluid cup mounted in said hood and opening onto said pieces.

HARRY LELAND GOODWIN.

Witnesses:
 FRANK GREGORY BIRD,
 F. A. CUTTER.